United States Patent

[11] 3,622,270

| [72] | Inventor | Indravadan S. Shah<br>Forest Hills, N.Y. |
|---|---|---|
| [21] | Appl. No. | 14,948 |
| [22] | Filed | Feb. 27, 1970 |
| [45] | Patented | Nov. 23, 1971 |
| [73] | Assignee | Chemical Construction Corporation<br>New York, N.Y. |

[54] REMOVAL OF SULFUR DIOXIDE FROM GAS STREAMS
5 Claims, 1 Drawing Fig.

[52] U.S. Cl. ............................................. 23/129,
23/2, 23/130, 23/131, 23/178, 23/201
[51] Int. Cl. ........................................... C01f 5/42,
C01b 17/56
[50] Field of Search .......................................... 23/129,
130, 131, 132, 133, 178 S, 178 R, 177, 201

[56] References Cited
UNITED STATES PATENTS

| 3,273,961 | 9/1966 | Rogers et al. | 23/130 X |
| 3,537,820 | 11/1970 | Markant | 23/131 X |
| 3,533,748 | 10/1970 | Finfer et al. | 23/226 R |
| 3,542,511 | 11/1970 | Shah | 23/130 X |
| 2,351,780 | 6/1944 | Palmrose | 23/130 |
| 2,572,929 | 10/1951 | Hazelquist | 23/130 |

FOREIGN PATENTS

| 38/2502 | 3/1963 | Japan | 23/129 |

Primary Examiner—Edward Stern
Attorney—J. L. Chaboty

ABSTRACT: Sulfur dioxide is scrubbed from a gas stream, such as a waste or flue gas, using an aqueous scrubbing solution containing dissolved magnesium sulfite and magnesium bisulfite, which is divided into two portions. A first portion is sprayed centrally downwards into a vertically oriented venturi passage through which the gas stream is passed in a downwards direction, and a second portion of the scrubbing solution flows downwards on the inner surface of the converging section of the venturi. Improved scrubbing efficiency is attained with low liquid to gas flow rates.

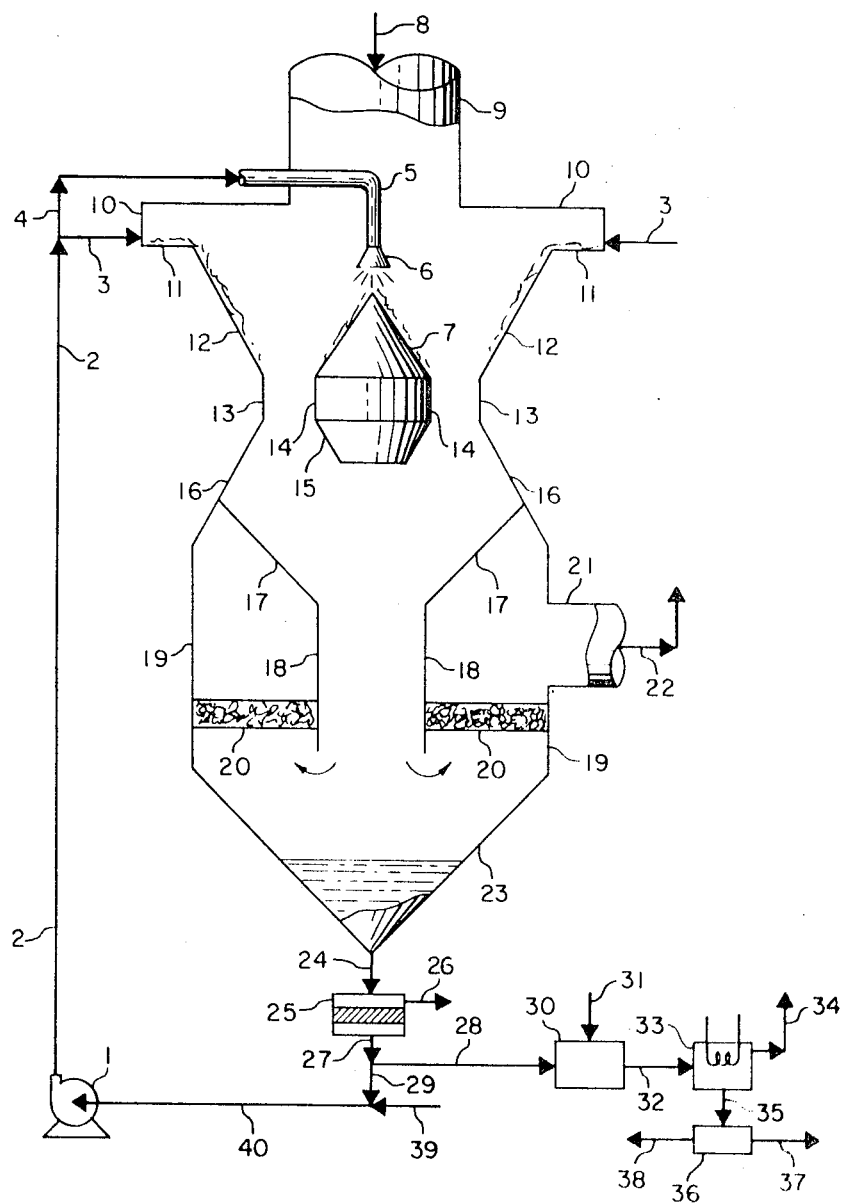
INDRAVADAN S. SHAH
INVENTOR.

REMOVAL OF SULFUR DIOXIDE FROM GAS STREAMS

BACKGROUND OF THE INVENTION

1. Field of the Invention

The invention relates to the removal of sulfur dioxide from gas streams such as waste or flue gases, to recover the sulfur dioxide and prevent air pollution. A circulating aqueous magnesium sulfite-bisulfite solution is employed to scrub the gas stream, with the resultant formation of further magnesium bisulfite in the solution. A bleed stream of solution is withdrawn and processed to produce a sulfur-containing product, and in some cases to regenerate magnesium oxide. Prior to recycle of the circulating solution, magnesium oxide is added to convert magnesium bisulfite to magnesium sulfite. The invention is particularly applicable to the scrubbing of waste gas streams, such as stack or flue gases from a power boiler, or other waste gases such as the tail gas from a sulfuric acid process or smelter off-gases, etc. The process of the present invention provides high efficiency scrubbing and high removal of sulfur dioxide, with resultant prevention of air pollution.

2. Description of the Prior Art

Developments in the improved scrubbing of gas streams with aqueous magnesium base solutions for sulfur dioxide removal have been important in the wood pulping technology, which employs magnesia-base pulping to produce wood pulp. The residual red liquor is concentrated and burned to produce regenerated magnesium oxide and an off-gas rich in sulfur dioxide. The magnesium oxide is slurried and slaked with water and employed to scrub the off-gas, so as to produce a regenerated acid magnesium bisulfite solution which is employed in the wood pulp process. U.S. Pat. Application No. 766,596 filed Oct. 10, 1968 is directed to an improvement in this art. In recent years, the scrubbing of waste gases such as flue or stack gases, or tail gas from chemical processes such as sulfuric acid, to remove sulfur dioxide and prevent air pollution, has assumed increasing importance. The use of magnesium oxide-sulfite or magnesium sulfite-bisulfite solutions or slurries for this purpose is generally described in U.S. Pat. Applications Nos. 737,186 filed June 14, 1968 and now allowed and 772,547 filed Nov. 1, 1968 and issued as U.S. Pat. No. 3,577,219 on May 4, 1971. Other disclosures include Chemical Processing V. 33 no. 1, issue for Jan. 1970 page 47; U.S. Pats. Nos. 3,428,420; 3,284,435; 3,273,961; 3,092,535 and 3,046,182; Canadian Pat. No. 822,001 and British Pat. No. 708,095.

SUMMARY OF THE INVENTION

In the present invention, a process is provided for the removal of sulfur dioxide from a gas stream such as waste or tail gas from a chemical process, or the flue or stack gases from a steam power boiler or the like, or any gas stream generated by the combustion of a sulfur-containing fuel. The present process is highly beneficial in the prevention of air pollution. The gas stream containing sulfur dioxide is scrubbed with a circulating aqueous solution containing dissolved magnesium sulfite and magnesium bisulfite, by passing the gas stream downwards through a vertically oriented venturi passage. A first portion of the aqueous scrubbing solution is centrally or axially sprayed downwards into the venturi passage, and a second portion of the solution flows downwards on the inner surface of the upper converging section of the venturi. The two portions of solution are projected into the high velocity gas stream in the throat of the venturi, and highly efficient gas scrubbing is attained with low liquid to gas flow ratios of 2.0 to 4.8 kg. of liquid per kg. of gas. The resulting scrubbed gas stream may be safely discharged to atmosphere without causing air pollution, or may be used for other purposes. The resulting aqueous solution of increased magnesium bisulfite concentration is recycled after removal of a bleed stream which is processed to produce a sulfur-containing product, and after addition of makeup magnesium oxide and water, which are generally added in the form of an aqueous slurry. The makeup magnesium oxide serves to adjust the relative proportions of magnesium sulfite and bisulfite in the scrubbing solution, by reacting with magnesium bisulfite to form further magnesium sulfite.

The principal advantage of the invention is that highly efficient scrubbing and removal of most of the sulfur dioxide from the gas stream is attained, with relatively low liquid to gas flow ratios, due to the provision of central axial dispersion of a portion of the scrubbing liquid into the venturi passage or contactor. Another advantage is that a valuable sulfur-containing product such as solid magnesium sulfite or a sulfur dioxide-rich gas stream is produced. A further advantage is that air pollution is prevented in an efficient and economical manner.

It is an object of the present invention to prevent air pollution due to sulfur dioxide emission, by means of an improved gas scrubbing process.

Another object is to remove and recover sulfur dioxide from a gas stream in an improved manner.

A further object is to provide a highly efficient process for the removal of sulfur dioxide from a gas stream using a circulating aqueous magnesium sulfite-bisulfite solution.

An additional object is to provide a process for sulfur dioxide removal from a gas stream which attains highly improved results in operation at relatively low scrubbing liquid to gas flow ratios.

These and other objects and advantages of the present invention will become evident from the description which follows.

DESCRIPTION OF THE DRAWING AND PREFERRED EMBODIMENTS

Referring now to the drawing, a flowsheet of a preferred embodiment of the invention is presented. A solution circulation pump 1 circulates solution stream 2 to the gas scrubbing process. Stream 2 is an aqueous solution containing dissolved magnesium sulfite and magnesium bisulfite, up to or beyond its solubility limits. About 50 percent to 90 percent of the total dissolved salts is present as magnesium bisulfite, with the balance being magnesium sulfite. The temperature of the circulating solution stream 2 is generally in the range of 20° C. to 95° C; and solution temperature will primarily depend on the initail temperature of the gas stream being scrubbed and the resulting saturated gas temperature.

Stream 2 is divided into stream 3 and stream 4. Stream 3 is utilized in the scrubbing process as will appear infra, while stream 4 is passed downwards via pipe 5 and spray nozzle 6 and is axially sprayed downwards onto the apex of the central conical flow diversion baffle 7, and is thereby also employed for gas scrubbing.

A gas stream 8 containing sulfur dioxide is passed downwards through vertical conduit 9, which is preferably coaxially disposed above conical baffle 7. Stream 8 is typically a waste flue gas stream containing in the range of 0.01 percent to 8.0 percent sulfur dioxide content by volume, and entrained solid particles of fly ash, and stream 8 is typically at an initial temperature in the range of 40° C. to 350° C. The relative flow rate of the total solution scrubbing stream 2, or stream 3 plus stream 4, is maintained in the range of 2.0 to 4.8 kg. of solution per kg. of gas stream 8. The gas stream discharged downwards from conduit 9 flows into the annular venturi passage below the annular horizontal baffle 10. An annular horizontal shelf 11 is spaced below baffle 10, and the solution stream 3 is passed onto shelf 11, either as a single stream which may be tangentially injected or as a plurality of portions as shown.

The annular venturi passage is defined by the inverted frustoconical baffle 12, which depends downward from shelf 11 and is spaced about conical baffle 7, so as to define an annular approach section, together with vertical cylindrical baffle 13, which depends downwards from baffle 12 and is spaced concentrically about the vertical cylindrical baffle 14, which depends downwards from conical baffle 7. The annular vertical passage between baffles 13 and 14 defines the throat section of the annular venturi passage. Streams 3 flow downwards on the inner surface of baffle 12 and are projected into the high velocity gas stream in the throat section, while stream 4 flows downwards on the outer surface of conical baffle 7 and is also projected into the gas stream at the throat section. The gas stream, which has been accelerated to high velocity by the converging approach section defined by baffles 7 and 12, is effectively scrubbed by the dispersed liquid solution phase for sulfur dioxide removal in the throat section defined by the annular vertical passage between baffles 14 and 13. A portion of the magnesium sulfite in the aqueous solution is thereby converted to magnesium bisulfite.

The resulting mixture of aqueous solution droplets dispersed in the gas stream, which is discharged downwards from the annular throat section, passes downwards into the diverging pressure regain section defined by the central inverted frustoconical baffle 15, which depends downwards from baffle 14, and the annular frustoconical baffle 16, which depends downwards from baffle 13. Separation of aqueous solution droplets from the scrubbed gas phase is preferably attained by providing solution droplet impingement and retention baffle 17, which is an inverted frustoconical baffle which depends from baffle 16 and is provided with a lower central cylindrical extension baffle 18. The baffles 17 and 18 are generally disposed in the vertical cylindrical solution-gas separating section on container 19, which depends downwards from the lower extremity of baffle 16. A flat horizontal annular ring-shaped mesh pad or packed bed 20 extends between elements 18 and 19, and section 20 serves as an entrainment separator, to separate entrained liquid droplets from the scrubbed gas phase which flows downwards through baffle or conduit 18 and upwards through the annular passage between elements 18 and 19. The scrubbed gas is removed via conduit 21, which extends from container 19 and passes the scrubbed gas stream 22 to suitable disposal such as atmospheric discharge via a stack, not shown.

The separated aqueous solution phase collects below container 19 in the lower solution retention section 23. In instances when stream 8 consists of flue gas containing entrained fly ash, or other types of gas streams which contain entrained solid particles, the solution collected in section 23 will contain solid particles derived from the scrubbing of the gas stream. In this case, the resulting aqueous solution stream 24 withdrawn from section 23 is passed through solids removal filter or centrifuge 25, from which the separated solids component is removed via stream 26 and passed to waste disposal or utilization. In most cases, stream 26 will be washed with a small amount of water to remove and recover any solid magnesium sulfite crystals or entrained solution which may be present in the wet solids stream 26, and the resulting wash water may be recycled to the system by addition to stream 2 or the like.

A clear aqueous solution stream 27 is discharged from filter 25. Stream 27 is divided into bleed stream 28, which consists of about 1 percent to 30 percent of stream 27, and recycle stream 29. Stream 28 is processed to recover a valuable sulfur-containing product such as magnesium sulfite. In this case, stream 28 is passed into reaction vessel 30 and reacted with magnesium oxide stream 31, which converts the magnesium bisulfite component dissolved in stream 28 to magnesium sulfite, so that the solution stream 32 discharged from unit 30 is an aqueous magnesium sulfite solution which usually contains precipitated solid crystals of magnesium sulfite. Stream 32 is passed into evaporator or concentrator 33, in which the liquid phase is heated to evaporate water which is discharged via stream 34. The resulting slurry stream 35 discharged from unit 33 is passed to centrifuge or filter 36, from which a solids component stream 37 consisting of product magnesium sulfite crystals is passed to product utilization. The mother liquor stream 38 discharged from unit 36 may be recycled to units 30 or 33 or added to stream 2 or the like.

In other instances, stream 28 may be processed to produce regenerated magnesium oxide and a sulfur dioxide-rich gas stream, in which case unit 30 and stream 31 would be omitted, with stream 28 passing directly to unit 33, and stream 37 would be calcined or roasted in a kiln or the like to regenerate solid magnesium oxide and generate an off-gas rich in sulfur dioxide, which could be processed to produce liquid sulfur dioxide, sulfuric acid, or other valuable sulfur-containing products, such as elemental sulfur.

The aqueous recycle solution stream 29 derived from stream 27 is combined with makeup aqueous magnesium oxide slurry stream 39, which serves to add makeup magnesium oxide and water to the circulating solution. The added magnesium oxide component of stream 39 reacts with magnesium bisulfite in stream 29 to form further magnesium sulfite in solution. The magnesium oxide may be separately added as a dry powder, in which case makeup water would be separately added to stream 29. Stream 38 and/or the wash water derived from the washing of wet solids stream 26 may also be added to stream 29. In any case, the resulting combined solution stream 40 is passed to pump 1 and recycled for further gas scrubbing as stream 2.

Numerous alternatives within the scope of the present invention will occur to those skilled in the art. Various types of gas-liquid contact devices may be employed to contact the gas stream 8 with the circulating aqueous solution. Various types of entrainment or mist separators can also be used instead of unit 20. In some instances, elements 7, 14 and 15 may be omitted, in which case a simple wet approach venturi contactor will be employed, defined by sections 12, 13 and 16. Central axial injection of solution portion stream 4 via spray nozzle 6 is provided in any case, to obtain the necessary scrubbing efficiency. In some cases, such as when stream 8 is derived as the tail gas from a sulfuric acid facility, or in other instances when stream 8 is free of entrained solid particles, unit 25 and its function may be omitted. Excessive buildup of solids such as fly ash in the system may be prevented in other instances by periodic or continuous bleed or purge of a portion of stream 24 or stream 2, or by the system described in U.S. Pat. Application No. 883,485 filed Dec. 9, 1969.

An example of test data and results obtained in a study of the operating characteristics and ranges of operating variables within the scope of the present invention will now be described.

Example
TABLE I.—EFFECT OF L/G, LIQUID SOLUTION TO GAS RATIO

| L/G, liters per actual cubic meter of gas | Kg. of solution per kg. of gas | Liquid inlet Solution, pH | Liquid inlet Sulfur dioxide, p.p.m.[1] | Percent removal efficiency |
|---|---|---|---|---|
| 4.0 | 3.6 | 5.8 | 1,460 | 70 |
| 4.42 | 3.95 | 5.7 | 5,000 | 82 |
| 5.35 | 4.8 | 5.8 | 1,460 | 92 |

[1] Parts per million.

Thus, with a liquid to gas ratio of less than 5 kg./kg., more than adequate efficiency is attained.

Table II

EFFECT OF SPRAY NOZZLE ELEMENT 6

| Variable | Spray Nozzle On | Spray Nozzle Off |
|---|---|---|
| Sulfur Dioxide in p.p.m. | 5000 | 5000 |
| Sulfur Dioxide out p.p.m. | 288 | 2168 |
| Efficiency % | 94 | 56.6 |

Thus, proper liquid distribution through the provision of the spray nozzle 6, and wet approach via stream 3, can significantly increase the scrubbing efficiency. Nozzle liquor of stream 4 gives one contact with the gas, and the wet approach via stream 3 gives another contact with the gas. This double contact permits the use of low liquid to gas ratios of less than 5 kg./kg. of gas, while still attaining high scrubbing efficiency.

I claim:

1. A process for the removal of sulfur dioxide from a gas stream which comprises scrubbing a gas stream containing sulfur dioxide with an aqueous scrubbing solution containing dissolved magnesium sulfite and magnesium bisulfite, said gas stream being passed downwards through a vertically oriented annular venturi passage provided with a central conical flow diversion baffle, with a first portion of said aqueous scrubbing solution being sprayed centrally downwards above the apex of said conical baffle and into said venturi passage, and a second portion of said aqueous scrubbing solution flowing downwards on the inner surface of the upper converging section of said venturi passage, whereby said gas stream is scrubbed with said aqueous scrubbing solution in the annular throat section of said venturi passage and sulfur dioxide is absorbed into the liquid phase to form further magnesium bisulfite in solution, with an overall scrubbing liquid to gas flow ratio being maintained below 5.0 kg. of liquid per kg. of gas in said venturi passage, separating the resulting gas stream of depleted sulfur dioxide content from the resulting aqueous scrubbing solution, dividing said resulting aqueous scrubbing solution into a first portion and a second portion, said first portion being in the range of 1 percent to 30 percent of the total resulting aqueous scrubbing solution, evaporating water from said first portion of said resulting aqueous scrubbing solution, whereby solid crystals of magnesium sulfite-bisulfite are formed, heating said solid crystals to produce a sulfur dioxide-rich gas stream and magnesium oxide, adding magnesium oxide and water to said second portion of said resulting aqueous scrubbing solution, whereby at least a portion of the dissolved magnesium bisulfite contained in said second portion is converted to magnesium sulfite, and recycling the resulting second portion for further gas scrubbing as said aqueous scrubbing solution.

2. The process of claim 1, in which said gas stream contains entrained solid particles, at least a portion of said solid particles are removed from said gas stream and entrained into said aqueous scrubbing solution, and at least a portion of said resulting aqueous scrubbing solution containing solid particles is filtered to remove said solid particles and produce a clarified solids-free solution.

3. The process of claim 1, in which said gas stream is a waste gas containing in the range of 0.01 percent to 8 percent sulfur dioxide content by volume, and said gas stream is at an initial temperature in the range of 40° C. to 350° C.

4. The process of claim 1, in which said magnesium oxide and water are added to said second portion of said resulting aqueous scrubbing solution in the form of an aqueous magnesium oxide slurry.

5. The process of claim 1, in which the overall scrubbing liquid to gas ratio in said venturi passage is maintained in the range of 2.0 to 4.8 kg. of liquid per kg. of gas.

* * * * *